US005469267A

United States Patent [19]
Wang

[11] Patent Number: 5,469,267
[45] Date of Patent: Nov. 21, 1995

[54] HALFTONE CORRECTION SYSTEM

[75] Inventor: Shenge Wang, Fairport, N.Y.

[73] Assignee: The University of Rochester, Rochester, N.Y.

[21] Appl. No.: 225,121

[22] Filed: Apr. 8, 1994

[51] Int. Cl.$^6$ ....................................................... H04N 1/21
[52] U.S. Cl. ........................ 358/298; 347/251; 358/459
[58] Field of Search ........................... 346/108, 1.1, 160, 346/107 R, 76 C; 358/296, 298, 456, 458, 459, 465, 461

[56] References Cited

U.S. PATENT DOCUMENTS

| | | | |
|---|---|---|---|
| 4,878,068 | 10/1989 | Suzuki | 346/108 |
| 5,087,981 | 2/1992 | Ng et al. | 358/459 |
| 5,278,671 | 1/1994 | Takahashi | 358/459 |

OTHER PUBLICATIONS

"Digital Halftoning", Text by Robert Ulichney MIT Press (1987)—Intro. Chapt. Pappas et al, J. Elect. Imaging 2(3), 193–204 (Jul. 1993).

Rosenberg, J. Electronic Imaging 2(3), 205–212 (Jul. 1993).

*Primary Examiner*—Mark J. Reinhart
*Attorney, Agent, or Firm*—M. LuKacher

[57] ABSTRACT

Prior to printing on a digital printer a halftone reproduction of a continuous one original image, digital image signals are corrected for the effects of printed dot overlap generated by a particular chosen digital printer. The dot overlap correction is based upon superimposing a virtual screen on the printer-generated dot patterns such that the printer dots are centered at the orthogonal intersections of the lines defining openings in the screen. This centering approach allows for determination of printed dot overlap by a 2× 2 matrix, so that only seven test patterns are required for characterization of the printer and for dot overlap correction of halftone prints produced by the printer.

15 Claims, 6 Drawing Sheets

HALFTONE CORRECTION SYSTEM

FIELD OF THE INVENTION

The present invention generally relates to a digital halftone correction system and more particularly to an improved system for halftone correction which addresses the effects of printed dot overlap in halftoning.

BACKGROUND OF THE INVENTION

Digital halftoning, also referred to as spatial dithering, is a process in which digital input signals to a digital printer are modified prior to printing a hard copy, such that a digitally printed version of a photographic image creates the illusion of the continuous tone scale of the photographic original. Most hard copy devices such as ink-jet printers and laser printers, whether write-black, write-white, or in color, operate in a binary mode, i.e. a printed dot is either present or absent on a two-dimensional printer medium at a specified location. Thus, due to the binary nature of such printers, a true continuous tone reproduction of a photographic image is not possible with digital printers. However, in order to approach the appearance of continuous tone, the digital input signals to the printer are modified prior to printing so as to direct the printer to spatially distribute fewer or more printed dots in the neighborhood or vicinity of a designated dot, thereby increasing or decreasing the distribution of printed dots about a designated area on the print. Since different types of printers, and even different printers among the same printer type, produce differently sized and differently shaped printed dots, and since even a chosen digital printer frequently generates printed dots having a size variation as a function of dot position, it has become apparent that a halftone correction system must be tailored to the characteristics of a particular chosen digital printer. Frequently, printed dots from write-black printers and write-white printers are of a size and shape such that dots printed adjacent to each other tend to overlap. Accordingly, a successful halftone correction system has to include considerations related to dot overlap correction. In a recent publication, titled *Measurement of Printer Parameters for Model-based Halftoning*, T. N. Pappas, C. K. Dong, and D. L. Neuhoff, *Journal of Electronic Imaging*, Vol. 2 (3), pages 193–204, July 1993, there are described various approaches toward halftone correction based on a dot overlap model of dots printed by a particular digital printer. To accomplish halftone correction, Pappas, et al. describe printing of a variety of test patterns by the same printer. The test patterns are intended to be used for characterization of printed dot overlap and are measured by a reflection densitometer (see particularly pages 198 and 199 of the Pappas, et al. publication) so as to obtain measured values of average reflectance of these various test patterns. The calculated printer model parameters, based on the measurement of test patterns, are then used to provide halftone correction or gray scale rendition of digital image data representative of an original image to be printed. Halftone correction can be accomplished for example by a known so-called modified error diffusion algorithm or by a known least-squares model algorithm. In the overlap correction approach described by Pappas et al., each printed dot is positioned within a superimposed or overlaid virtual Cartesian grid such that the center of each dot is coincident with the center of the spacing between adjacent grid lines. Accordingly, Pappas, et al. require at least 32 total test patterns for the simplest shape of the scanning window, 512 possible test patterns for a 3×3 scanning virtual window, and a total of 33,554,432 possible test patterns for a 5×5 scanning virtual window matrix. Even when considering that dot overlapping can be symmetric about both the x and y directions of the grid, thereby reducing the number of possible patterns, the computational complexity and associated complicated optimization calculations become formidable in the overlap correction approach described by Pappas, et al.

Another publication, titled *Measurement-based Evaluation of a Printer Dot Model for Halftone Algorithm Tone Correction*, by C. J. Rosenberg, *Journal of Electronic Imaging*, Vol. 2 (3), pages 205–212, July 1993, describes a tone scale correction approach for digital printers which produce potentially overlapping circular dots, each dot centered at the center of a grid opening of a superimposed grid. This dot overlapping model assumes that all printed dots have a perfectly circular shape. Here, the reflectance of a number of constant gray scale test patches or test patterns is measured, and the reflectance values are inverted to obtain a correction curve. This measurement-based calibration of a printer (see FIG. 2 of the Rosenberg paper) is repeated for all digital gray levels anticipated to be printed by the printer. The tone response correction curves are then used in conjunction with one of several known halftoning algorithms to generate a calculated dot diameter which would provide a best fit to the measured data, whereby one best fit approach is based on minimizing the rms error between the measured tone response curve and that derived from the model, and a second approach is based on generating an improved match in terms of the visual perception by a human observer.

Thus, digital halftone correction and particularly dot overlapping halftone correction relies upon the determination of the actual physical output of a printer for given binary digital printer input signals. Accordingly, it would be desirable to devise a halftone correction system for overlapping printed dots which minimizes the required number of test patterns, thereby minimizing the complexity of determinations of the extent of printed dot overlap and the attendant computations, while achieving an effective dot-overlapping halftone correction system.

SUMMARY OF THE INVENTION

It is the principal object of the present invention to provide a dot overlap halftone correction system for a chosen digital printer in which the halftone correction of image signals corresponding to domains of an original two-dimensional continuous tone image is achieved with a reduced number of test patterns, a simplified characterization of dot overlap, and a method of halftone correction.

Another object of the invention is to provide an improved halftone correction system in which dot overlap is characterized by superimposing a virtual orthogonal screen on the printed dots such that the center of each dot is coincident with the intersection between orthogonal lines of the screen.

A further object of the present invention is to provide an improved dot overlap halftone correction system in which potentially overlapping printed dots are located on a virtual superimposed two-dimensional screen having orthogonal screen coordinates such that each rectangular-shaped screen opening can contain contributions from up to four adjacent overlapping dots within a two-by-two arrangement of dots surrounding the opening in the screen.

A still further object of the present invention is to provide an improved dot overlap halftone correction system for a chosen digital printer in which seven test patterns printed by the printer are sufficient to generate the desired halftone correction.

Briefly described, the invention provides a dot overlap halftone correction system usable with a particular chosen digital printer, so as to permit the printing of two-dimensional halftone images corrected for overlap of printed dots from a continuous tone two-dimensional original image, which has been digitized into multi-level digital signals by a scanning device, these digital image signals correspond to the gray levels of respective area on the original image. The halftone correction system of the present invention is based upon such characterization of printed dot overlap that each printed dot pattern is considered as being overlaid by a two-dimensional virtual screen or grid positioned relative to the printed dots in such a manner as to position the center of each dot at the intersection of two orthogonal lines of the screen or grid, thereby making it possible for a digitally generated virtual scanning window to contain contributions from up to four immediately adjacent and potentially overlapping printed dots, this scanning window being of dimensions equal to the openings of the screen. Thus, the scanning window effectively "sees" a portion of a 2×2 matrix of adjacent printed dots. Due to the selected positioning of the screen with respect to the centers of the printed dots, the scanning of the 2-dot ×2-dot matrix by the window allows a complete characterization of the printed dot pattern with a total number of sixteen possible combinations of overlap. Furthermore, considering the symmetries of dot overlap, there are only seven distinct overlap possibilities among the total of sixteen possible combinations.

For calibrating or determining the overlap degrees or the extent of dot overlap of the seven distinct overlap possibilities, the present invention selects seven particular test patterns printed on a selected printer medium (such as paper or transparent foil), and each test pattern is characterized by one of the seven overlap possibilities.

An overall optical reflectance (for a paper printer medium) or an overall optical transmittance (for a transparent printer medium) is measured for each test pattern. These values are normalized to digital signal levels ranging, for example, from a digital signal level value of 255 for an all white pattern (no printed black dots, no overlap) to a digital signal equivalent value of O for a completely black test pattern (comprising four overlapping black dots). That same digital signal input range is provided by the digital signals generated by the scanner or scanning device used to digitize the continuous tone image of an original pictorial presentation. From the normalized digital signal levels corresponding to the optical characteristics of the test patterns, dot overlap degrees are derived and are used in known halftoning techniques (e.g., dithering or error diffusion techniques) to provide dot overlap corrected image input signals to the printer, so that a halftone corrected print of the two-dimensional continuous tone original image can be printed on the chosen printer.

Thus, the present invention provides a system and method for dot overlap corrected halftone printing based upon the determination of the degree of dot overlap within each one of a plurality of adjacent 2×2 patterns of immediate neighbor dots. These 2×2 patterns may also be called matrices or clusters or groupings, and cover the entire image.

BRIEF DESCRIPTION OF THE DRAWINGS

The present invention will be better understood and appreciated more fully from the following detailed description, taken in conjunction with the accompanying drawings, in which:

FIG. 6A is printed by using a known error-diffusion algorithm, but without dot overlap correction, while FIG. 6B uses the same error-diffusion algorithm, but with dot overlap correction in accordance with the present invention.

DETAILED DESCRIPTION OF THE EMBODIMENTS

Figure 1:
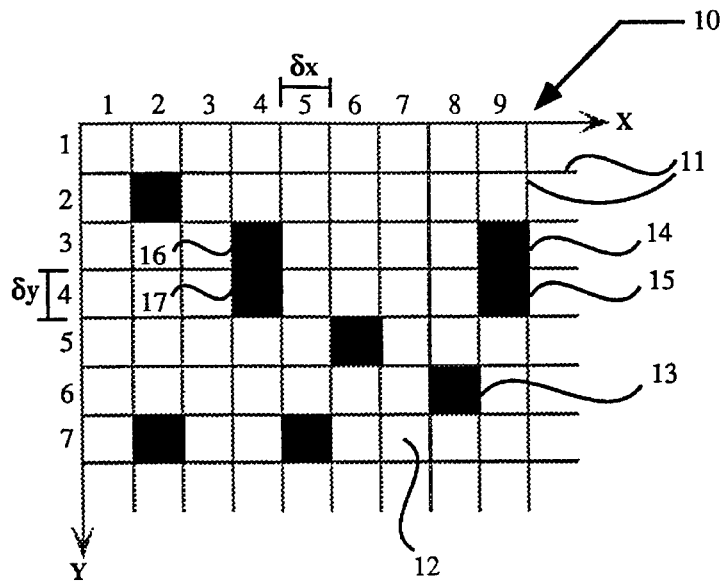
FIG. 1 is an enlarged rendition of an idealized printer output, showing square-shaped, non-overlapping printed dots positioned within an orthogonal screen or grid such that each dot is located coincident with a screen opening.

Referring now to FIG. 1, there is shown an enlarged rendition 10 of idealized, square-shaped digital printer output dots 13–17, placed or positioned in a superimposed or overlaid X-Y orthogonal screen or grid system, each grid opening 12 having dimensions δx, δy. Grid lines 11 delineate screen or grid openings 12. Each idealized square dot is positioned centrally within each screen opening 12. Adjacent printed dots 14, 15 and 16, 17 are non-overlapping.

Figure 2:
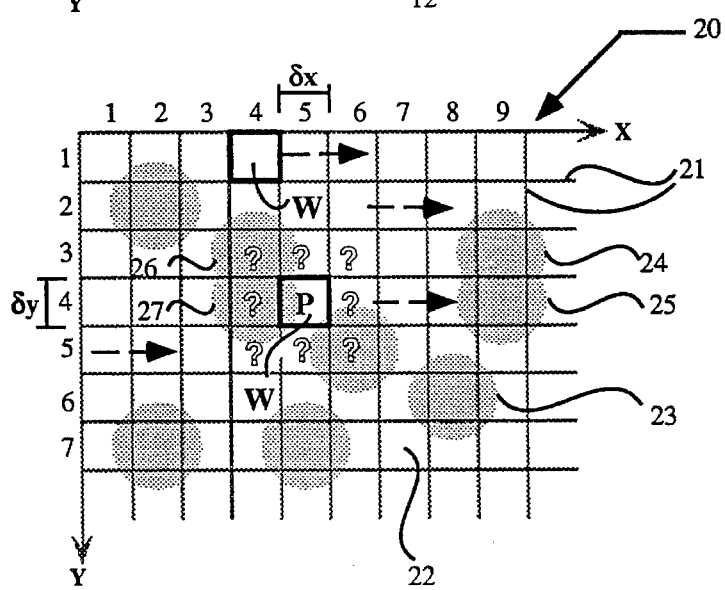
FIG. 2 is an enlarged prior art rendition showing circular printed dots positioned in an orthogonal coordinate system of a screen or grid Where the dots are centered at the center of each opening in the screen, and where the diameter of the dots is larger than the screen openings. A window W is indicated as a scanning window, having a size identical to the size of the screen openings.

Referring now to FIG. 2, there is depicted an enlarged prior art version 20 of circularly shaped dots 23–27, located within an overlaid orthogonal X-Y coordinate system, each printed dot being centered at the center of a screen opening 22 having dimensions δx, δy. A window W congruent with a screen opening 22, is indicated by arrows as a scanning window. The diameter of each circular dot is larger than a screen opening. At the window position indicated at pixel 5 along the X axis and pixel 4 along the Y axis, the window is surrounded by eight question marks, intended to indicate the uncertainty of the degree of dot overlap contributions P to the window of the eight dots immediately surrounding the window in that position. It is evident that dot 26 and dot 27 may contribute to the filling of the window to a certain extent, as is the dot in pixel position 6, 5. Thus, it appears that dot overlap contributions P to a window W can not be easily ascertained from the status of eight surrounding dots in addition to the window position itself when the dots are centered at the center of the screen openings.

Figure 3:
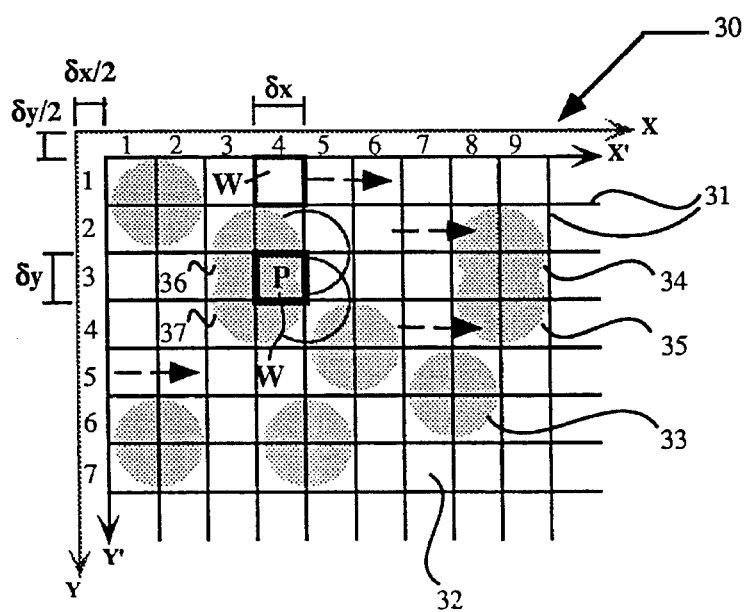
FIG. 3 is an enlarged rendition of printed circular dots located within an orthogonal coordinate system in accordance with the present invention, where the coordinate system is shifted relative to the coordinate systems FIGS. 1 and 2 by an amount equal to ½ the dimension of each screen opening in both orthogonal directions, so that the printed circular dots are now centered at the intersection of two orthogonal grid lines, respectively. The circular dots have a diameter larger than the dimensions of the openings in the screen. A scanning window W is shown in a position centered about the position of four adjacent dots, two of the dots actually overlapping and two dot positions indicating an absence of printed dots.

Referring now to FIG. 3, there is shown an enlarged rendition of a printer output 30, having produced circular shaped dots on an overlaid rectangular coordinate screen system designated by coordinates X' and Y', offset from the original X-Y coordinate system of FIGS. 1 and 2 by half of the grid dimension δx and δy. Again, the diameter of each dot is larger than the screen opening dimensions δx and δy. The effect of the offset of the screen coordinate system is to position circular dots 33–37 such that the center of each dot is now centered at the intersection of lines 31 defining screen openings 32. A virtual scanning window W is again indicated by arrows. At the window position 4 along the X' axis and position 3 along the Y' axis there is shown a substantial contribution P of circular dots 36 and 37 in terms of their overlap within the window at that location. Open circles, drawn centered at the upper and lower right-hand corners of the window W, are included to suggest that the location of printed dots on the orthogonal coordinate system X', Y' provides for dot overlap contributions P to the window from a 2×2 matrix of dots immediately surrounding the window at the window position shown here.

Referring again to FIG. 2, the printed dots are controlled by a binary digital signal input B(i,j), where B(i,j)=0 indicates a dot present at a position indexed by i,j, and B(i,j)=1 indicates an absent or missing dot at the same position i,j. The output G(i,j) of a chosen digital printer is a measure of an average optical characteristic feature (for example, reflectance, or transmittance) of a window defined within a grid or screen coordinate system X-Y, such that i δx≤x≤ (i+1) δx and j δy≤y≤(j+1) δy.

It is this centering concept of dots on the shifted screen which provides the advantages of the invention over the previously disclosed approaches, as will be described below.

Considering for example, the 3×3 matrix case suggested in the previously mentioned paper by Pappas et al., for the situation when overlap among dots may exist: in that case the output of a given pixel G(i,j) depends on the dot overlap contribution P to a window W by a dot in the window and by the 8 immediate neighbors shown by the question marks in FIG. 2. Hence, G(i,j) can be described in a general form as:

$$G(i,j)=G\{B(i-1,j-1),B(i,j-1),B(i+1,j-1),B(i-1,j), B(i,j),B(i+1,j), B(i-1,j+1),B(i,j+1), B(i+1,j+1)\}, \quad (1)$$

where

G(i,j)=the printer output function at a position i,j within an x-y coordinate system, where each printed or absent dot is centered at the center of a screen opening B(i,j)=the printer binary input function which determines whether a dot is printed (B(i,j)=0) or is not printed (B(i,j)=1) at a position i,j.

Therefore, the previously described 3×3 overlapping matrix requires $2^9$ or 512 independent parameters to calculate the possible values of the output function G(i,j) with all possibilities for dot overlap. While this number of 512 independent parameters can be reduced under the assumption of symmetry of overlap in both X and Y directions, and may be further reduced under certain circumstances, the number of independent parameters for a 3×3 matrix having eight potential dots surrounding the window W can not be reduced below 50. To arrive at a solution for 50 independent parameters requires substantial computational effort and expense.

In contrast to the 3×3 matrix approach disclosed by Pappas, et al., the centering concept of the present invention requires only a matrix of 2×2 adjacent dots, in view of the shifted screen or grid pattern relative to the position of the printed dots. For example, an output pixel G' (i,j), indicated by the window position 4 along the X' axis and 3 along the Y' axis in FIG. 3 is located at the center of four dot positions controlled by the printer input codes B(i−1,j−1), B(i,j−1), B(i−1,j) and B(i,j).

This simplest 2×2 overlapping matrix leads to only 16 possible combinations of overlap from the four binary codes representative of the four possible dot status conditions about the window in FIG. 3. Accordingly, an output function G' has a maximum of 16 independent parameters which can be expressed as 16 different overlapping patterns.

Figure 4:
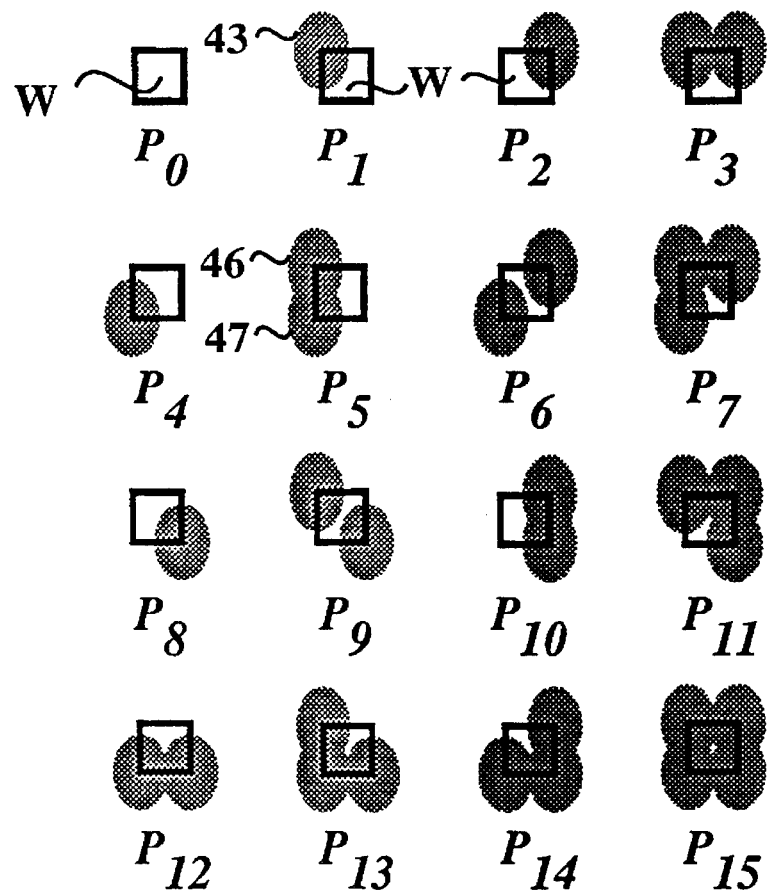
FIG. 4 indicates 16 possible combinations of potential overlap of up to four adjacent elliptically-shaped printed dots within a window W for the matrix or grouping of 2×2 overlapping dots indicated in FIG. 3.

Referring now to FIG. 4, there is shown in bold outline a window W indicative of the same window shown in FIG. 3, and overlap patterns $P_0$–$P_{15}$, indicating various degrees of dot overlap fill factor or contribution P to window W by elliptically shaped printed dots 43, 46, and 47. Using conditions of symmetry of dot overlap about both the X' and Y' directions, only seven independent overlap patterns are required, namely $P_0$, $P_1$, $P_3$, $P_5$, $P_6$, $P_7$, and $P_{15}$. Accordingly, seven spatially periodic and independent test patterns are generated as a binary input to the chosen printer to be tested. Each test pattern is characterized by one of the seven distinct and independent dot overlap patterns.

Figure 5:
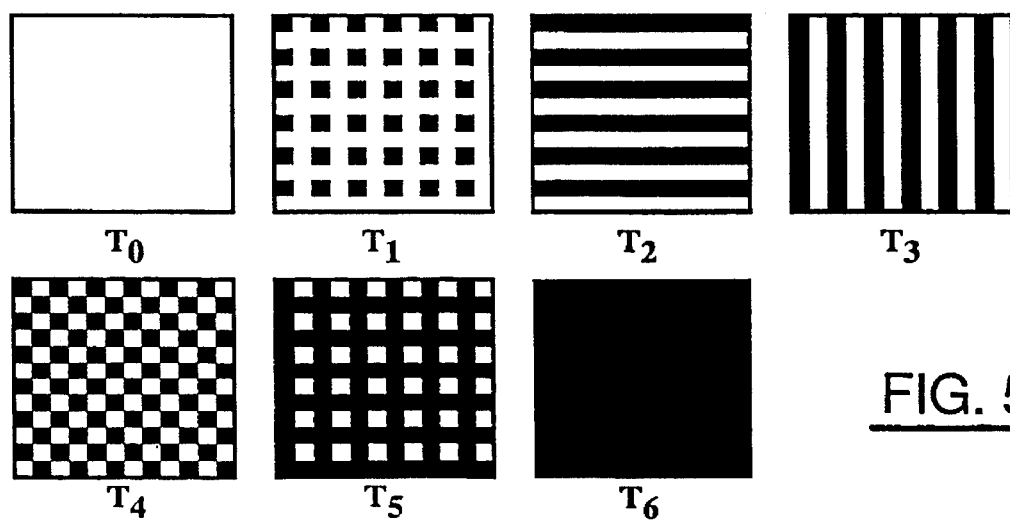
FIG. 5 shows enlarged portions of seven test patterns which are characterized by the seven remaining independent overlap patterns of the 16 possible patterns shown in FIG. 4, when considering symmetry of overlap.

Referring now to FIG. 5, there are shown portions of seven enlarged test patterns $T_0$–$T_6$ generated by a perfect printer, meaning the printer would produce square-shaped dots without any overlap among adjacent printed dots, and these patterns show no overlap. The input signals of these patterns are then printed by the chosen non-perfect printer, for example by a write-black printer on a white reflective printer medium for determining the effect of dot overlap corresponding to the remaining independent overlap patterns discussed with reference to FIG. 4.

Table 1 shows an example of the printer output value G' of overlapping patterns from the measured average reflectance values produced by each of the seven test patterns $T_0$–$T_6$ of FIG. 5. Table 1 associates each of the test patterns $T_0$–$T_6$ with the corresponding overlap patterns $P_0$–$P_{15}$ and gives the measured and normalized average reflectance output values G' as well as the idealized output values G representative of perfectly square-shaped dots of area δx × δy. The estimated printer output values G' can represent average reflectance values of overlapping dots when the dots are printed on a reflective printer medium such as paper, or they can represent average transmittance values when overlapping dots are printed on a transparent printer medium. The G' values are normalized to fall within the range of digital gray level signals which are identical to the range of digital image signals provided by the image scanner used to digitize an original continuous tone two-dimensional image. The fill factor or fraction of overlap within window W is also provided for ideally shaped square dots for each of the overlapping patterns.

TABLE 1

Normalized average values (G') from measurement of test patterns printed by a chosen digital printer

| Over-lapping Patterns (FIG. 4) | Corresponding Pattern (FIG. 5) | G' Signal Levels (test pattern by a chosen printer | G Signal Levels (test pattern with assumed square dots) | Fraction of Overlap Within Window W (square dots) |
|---|---|---|---|---|
| $P_0$ | $T_0$ | 255 | 255 | 0 |
| $P_1, P_2, P_4, P_8$ | $T_1$ | 54 | 192 | 0.25 |
| $P_3, P_{12}$ | $T_2$ | 14 | 128 | 0.5 |
| $P_5, P_{10}$ | $T_3$ | 8 | 128 | 0.5 |
| $P_6, P_9$ | $T_4$ | 4 | 128 | 0.5 |
| $P_7, P_{11}, P_{13}, P_{14}$ | $T_5$ | 2 | 64 | 0.75 |
| $P_{15}$ | $T_6$ | 0 | 0 | 1.0 |

Further processing of these normalized printer output values G' can include an error-diffusion halftoning approach such as a known so-called Floyd-Steinberg error-diffusion method. This well-known error-diffusion method requires the comparison of a desired gray level of image signals with a threshold level T, which in that method is centered at a signal level of 128 for 8-bit gray levels (out of a total of 256 available image signal gray levels). In contrast to the standard error-diffusion halftoning, the dot overlap halftone correction system of the instant invention employing the dot-centering at the intersection of grid lines and the resultant 2×2 matrix requires a threshold level T as given by the following relationship:

$$T = \frac{1}{2} [G'\{B(i-1,j-1), B(i,j-1), B(i-1,j), 0\} - G'\{B(i-1,j-1), B(i,j-1), B(i-1,j), 1\}], \quad (2)$$

where

T=threshold level

G'=a printer output function, such as, for example, an average reflectance within a currently examined window;

B(i, j)=binary discrete printer input function which controls the printed dots either on or off (i.e. a dot is present or absent);

i, j=integers with $0 \leq i < M$ and $0 j < N$, which determine the location of a dot in an orthogonal matrix of columns of dots (M) and rows of dots (N).

This threshold determination takes into consideration the effect of dot overlap and the resultant non-ideal G' values of average reflectance or transmittance from the test patterns $T_0$–$T_6$, and hence relates to the dot overlap patterns $P_0$–$P_{15}$ discussed with reference to FIG. 4.

Based upon these threshold values for each of the test patterns, the multi-level digital image signals representative of the digitized original image are then used accordingly in conjunction with a known halftoning program so that a final digital print has the dot overlap halftone correction which renders the appearance of the digital print from a chosen digital printer a best-matched replica of the original two-dimensional continuous tone image.

The halftone correction system and associated program flow chart will be described in more detail with reference to FIGS. 8 and 9, respectively.

Figure 6A:
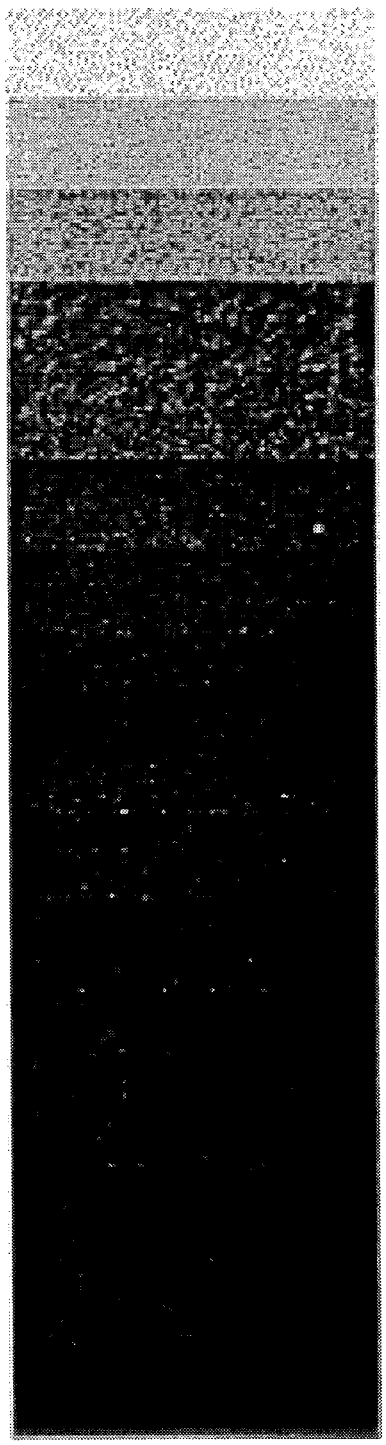
FIGS. 6A, B show a 16-step uniform gray-level step tablet printed by a write-black laser printer, where
Figure 6B:
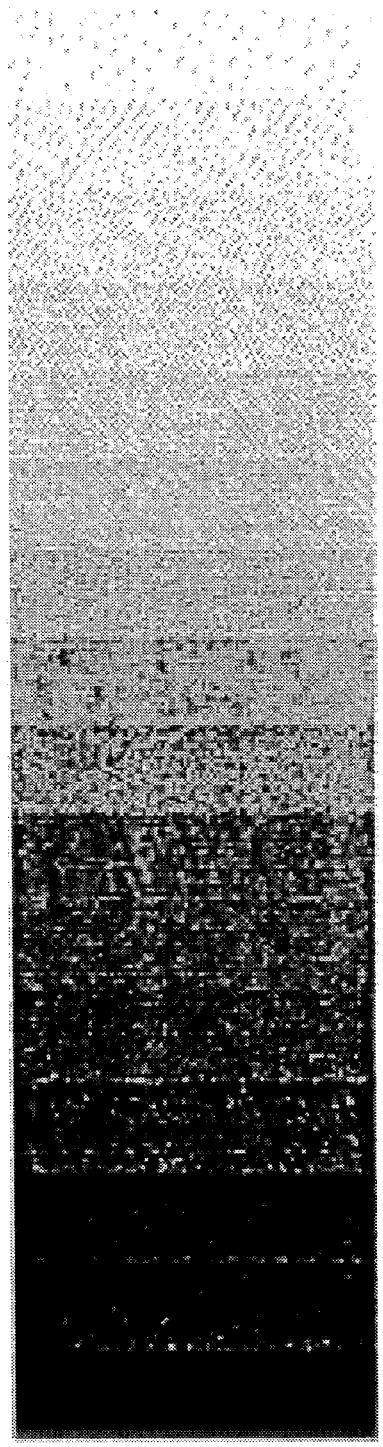

Referring now to FIGS. 6A and 6B, there are shown two 16-step gray-level step tablets printed by a write-black laser printer on a reflective white paper printer medium. FIG. 6A is a print generated by a known Floyd-Steinberg error-diffusion halftoning program without considering the dot overlap halftone correction of the present invention. FIG. 6B uses the dot overlap halftone correction of the present invention in conjunction with the Floyd-Steinberg error-diffusion halftoning approach.

Briefly described, in the Floyd-Steinberg error-diffusion method, as adapted to digital printers, a desired digital gray-level signal D(i,j) (corresponding to a domain (i,j) within an original continuous tone two-dimensional image) is compared with a threshold level signal T, where T equals 128 for 8-bit gray level image signals. The discrete binary printer input B(i,j), which controls a printer dot either "on" (a dot is printed) or "off" (a dot is not printed), depends on the result of that comparison. The difference between the desired gray level printer output and the actual printer output, namely D(i,j)–G(i,j), is distributed to immediate neighbors of a processed pixel or window W in accordance with a weighted distribution around that processed pixel or window. Thus, additional dots may either be printed or not printed in immediate-neighbor positions surrounding a given pixel.

A detailed description of this error-diffusion approach may be found in the publication by R. Floyd and L. Steinberg, titled *Adaptive Algorithm for Spatial Gray Scale*, SID International Symposium Digest of Technical Papers, pages 36–37, 1975.

Figure 7:
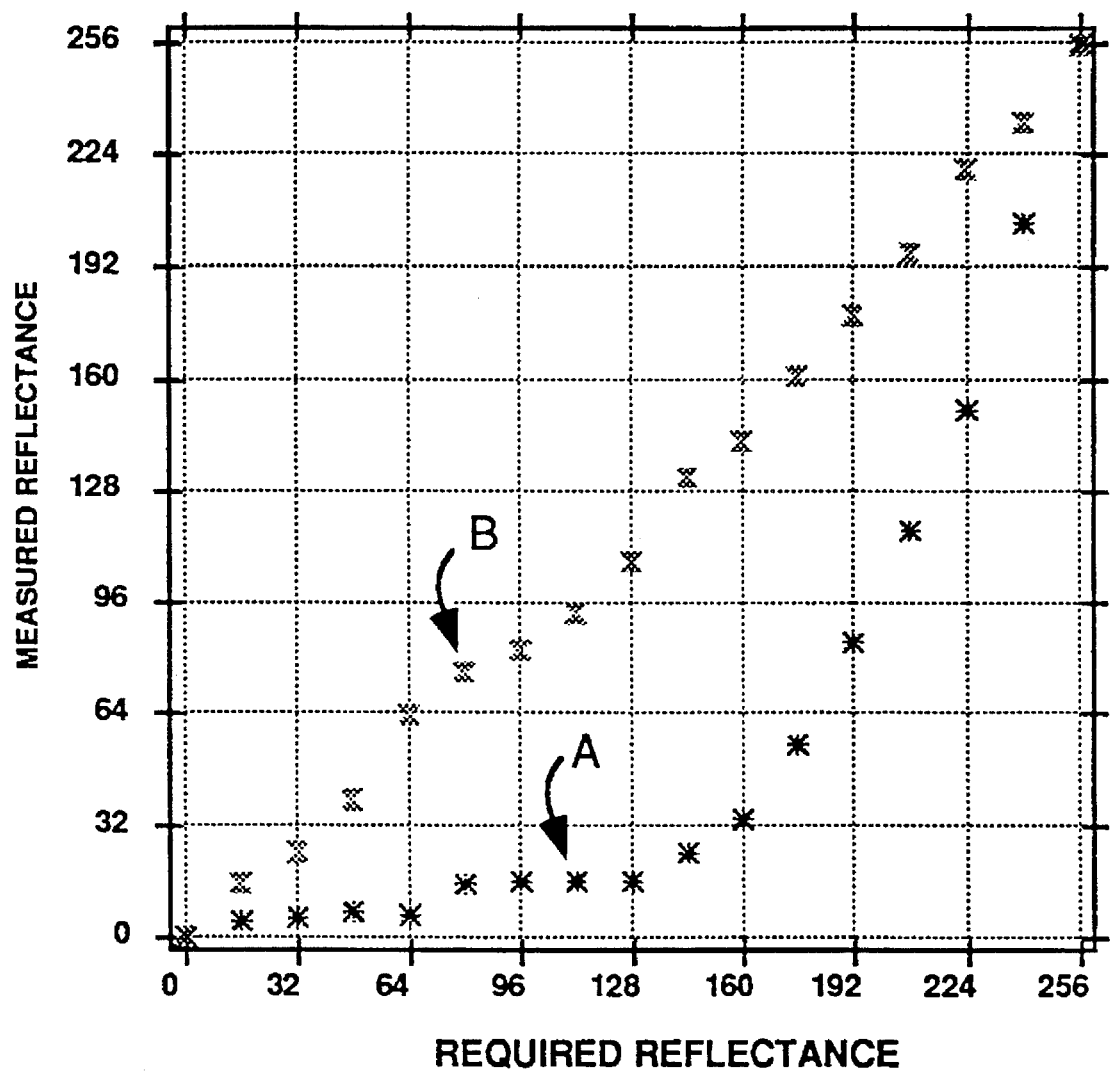
FIG. 7 is a plot of measured reflectance versus required reflectance of the two 16-step gray-level step tablet reproductions shown in FIGS. 6A and 6B, indicating the substantial effect of the dot overlap correction in the data points corresponding to FIG. 6B compared to the data points of the uncorrected 16-step gray-level step tablet corresponding to FIG. 6A.

Referring now to FIG. 7, there is provided a graph showing measured reflectance versus required reflectance of the gray-level step tablets depicted in FIGS. 6A, B, respectively. It is apparent from FIG. 7 that the dot overlap halftone correction system of the present invention used in conjunction with the known Floyd-Steinberg halftoning approach, indicated as B in FIG. 7 provides a substantially corrected set of data points compared to the halftoning shown as data points A using the Floyd-Steinberg error-diffusion halftoning alone, i.e., without dot overlap correction.

Figure 8:
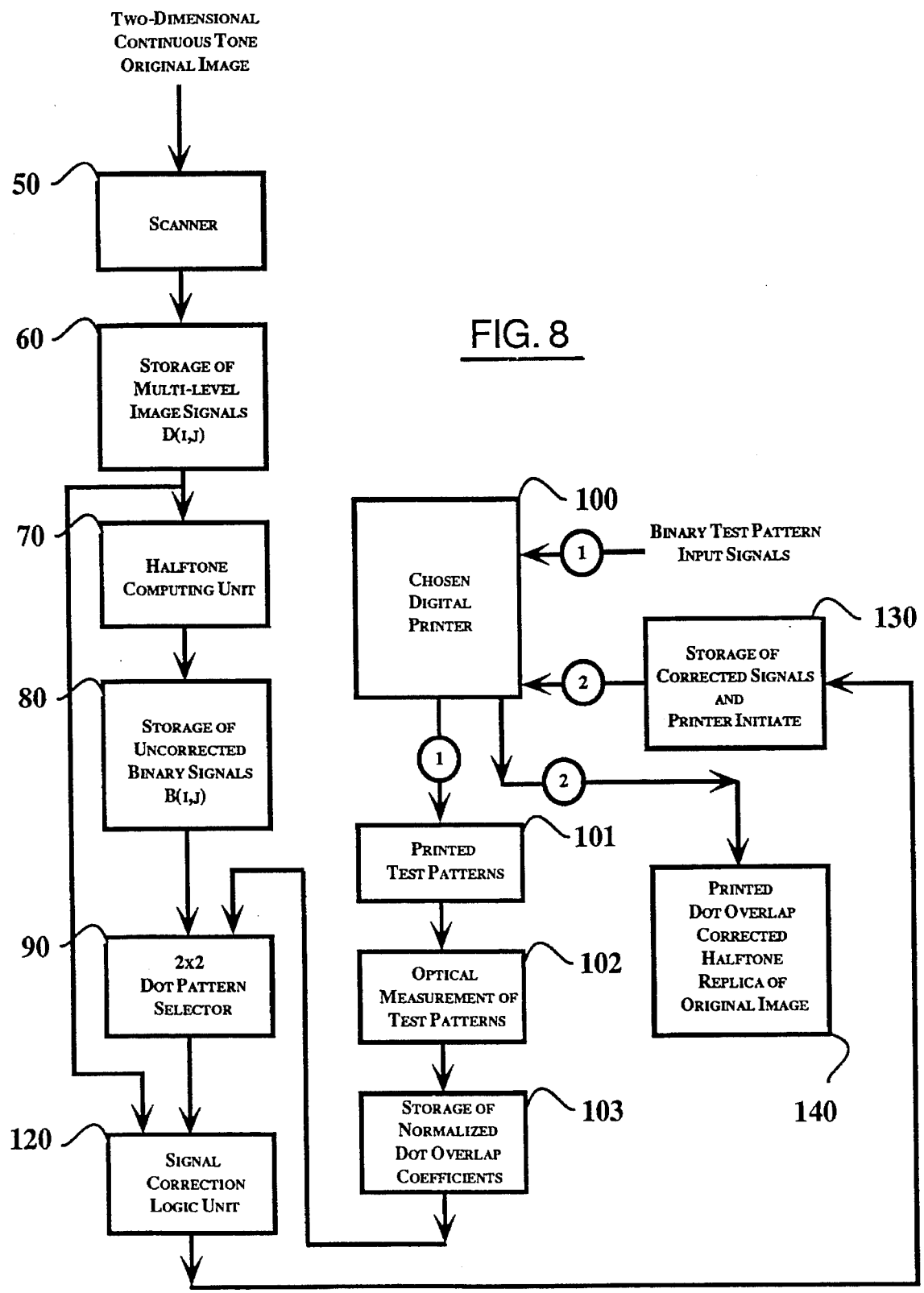
FIG. 8 is a schematic system block diagram of the dot overlap halftone correction system in accordance with the present invention.

Referring now to FIG. 8, there is shown a schematic system block diagram of the dot overlapping halftone correction system of the present invention.

For calibration of a chosen digital printer 100, i.e. for determination of the actual physical overlap degrees, or the extent of dot overlap, the chosen printer 100 is first addressed with a sequence of seven test pattern binary input signals, thereby providing a printed output 101 of the seven test patterns (described with reference to FIG. 5) on a selected printer medium such as, for example, a reflective paper medium or a transmissive foil printer medium. From each of the seven printed test pattern outputs 101 is measured an average optical characteristic feature 102, which may be average optical reflectance in the case of printed test pattern dots on a reflective medium or average optical transmittance when a transparent printer medium was printed upon. These average values of optical characteristic features of each test pattern are normalized to represent dot overlapping coefficients G' extending from a digital signal level O to a test pattern digital signal level of value 255, and these normalized dot overlapping coefficients are stored in a computer memory 103.

This calibration procedure is conducted every time when the printing environment has-been changed, for example, when the printer medium has been changed. Also, to provide a consistent high quality of printer output the calibration procedure described previously is conducted regularly, daily or weekly upon the requirement, so that the overlapping coefficients stored in memory 103 are updated frequently.

For generating a halftone reproduction of a two-dimensional continuous tone image such as for example, a photograph, the original continuous tone image is digitized in a scanner 50 and resulting multi-level digital image signals D(i,j) corresponding to respective area in the original continuous tone image are stored in a computer or computer frame store 60. The digital image signals D(i,j) can have discrete signal levels over a range extending from a O signal level to a level representing a count of 255. A halftone computing unit 70 applies a known halftoning program so as to compute an uncorrected halftone binary printer input signal B(i,j) from stored multi-level image signal D(i,j). The discrete binary signals B(i,j) represent an uncorrected dot distribution image and are stored in a computer memory 80. A virtual two-dimensional grid or screen (not shown) is positioned so that each dot position of the dot distribution image B(i,j) is centered on that screen at each intersection of orthogonal screen or grid lines, where these lines define screen openings $\delta x \times \delta y$, as shown in FIG. 3. A scanning virtual window (not shown) effectively provides a 2×2 dot pattern selector 90, by which the 2×2 dot pattern selection is made of as yet uncorrected binary input signals B(i,j). Each selection is chosen from sixteen possible dot overlap patterns $P_O - P_{15}$ of FIG. 4, and has a corresponding normalized dot-overlapping coefficient G', chosen from the computer memory storage 103. By superimposing the virtual screen of the present invention on the dot distribution image B(i,j) in storage 80, an estimated physical appearance or optical characteristic features of the pretended printer output defined by the uncorrected input signals B(i,j) is predicted by the 2×2 dot pattern selector 90.

In a signal correction logic unit 120 the estimated physical appearance of the uncorrected printer input signals B(i,j) is compared with the multi-level digital image signals D(i,j) stored in storage 60. Signal correction logic unit 120 also applies a necessary modification or correction so as to computer a dot overlap corrected halftone binary printer input signal which is stored in a compute or compute frame store 130 connected to the input of the chosen digital printer 100. Printer 100 can be initiated to produce a dot overlap corrected halftone print 140 of the original two-dimensional continuous tone image upon release to the printer input of the stored corrected signals in storage 130.

Figure 9:
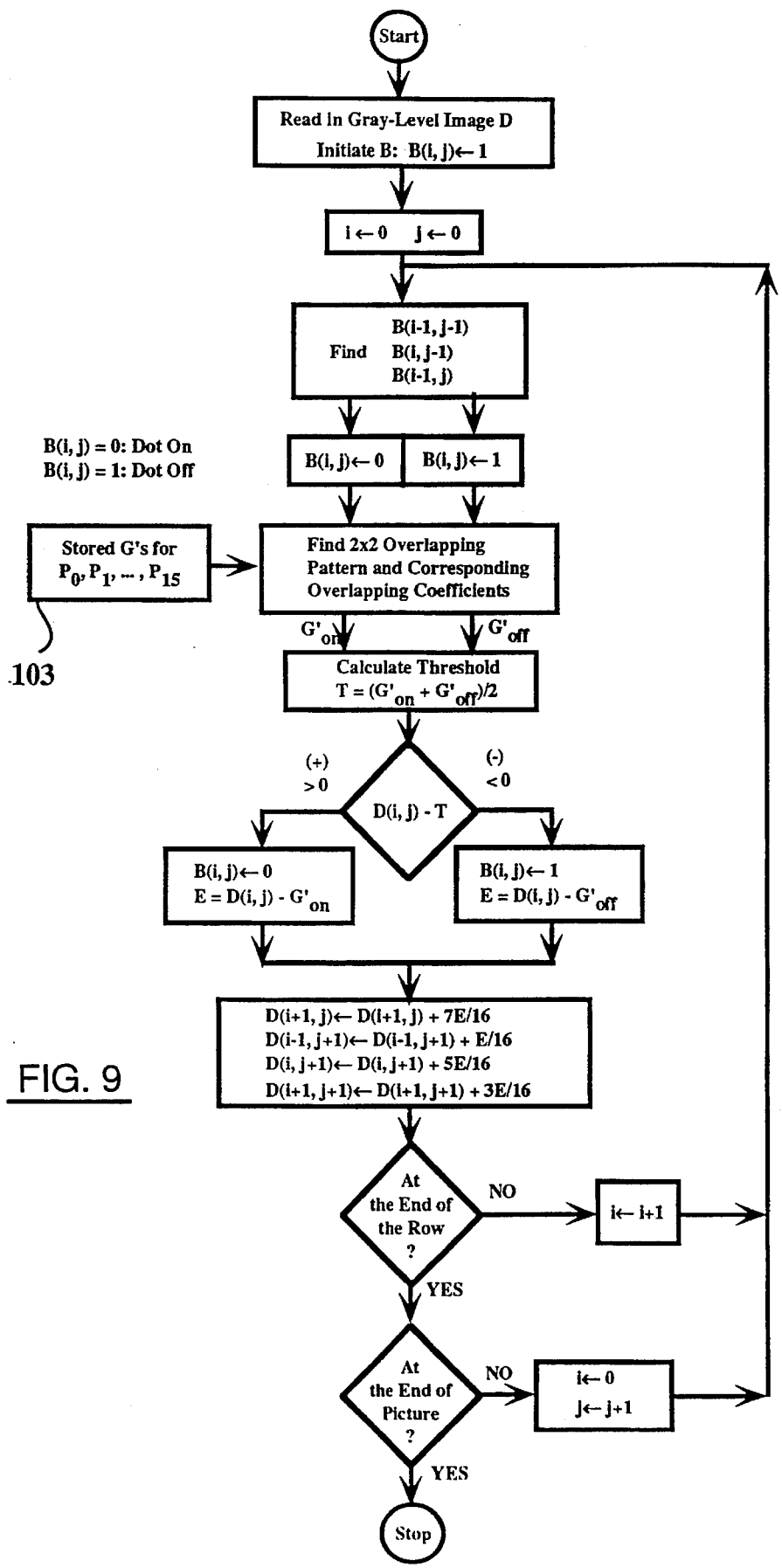
FIG. 9 is a flow chart of the program which provides the correction shown in FIG. 8, as applied to error diffusion halftoning.

Referring now to FIG. 9, there is depicted a flow chart of the program which provides the dot overlap correction for halftone printing, as applied to error diffusion halftoning by the known Floyd-Steinberg halftoning approach. The program of FIG. 9 provides the signal flow from multi-level image storage 60 to signal correction logic unit 120 of FIG. 8.

Upon initiating program "Start", the multi-level image signals D(i,j) stored in storage 60 are read into halftone computing unit 70 of FIG. 8. This unit conducts error-diffusion halftoning program sequentially throughout the entire two-dimensional image, starting at the location (0,0), i.e., at the origin of the image, and progressing to the location (i,j). Binary signal B which defines the printed dot distribution is determined by the halftoning program, dot by dot and row by row in a sequence. B(i,j)=0 indicates a dot printed at the location (i,j), or a dot "on" state, and B(i,j)=1 indicates an absent dot, or a dot "off" state.

Reaching a particular location (i,j), the system has a partially finished binary image, which contains B(0,0), B(1, 0), ..., up to B(i-1,j), stored in storage 80 of FIG. 8. By superimposing the virtual screen of the present invention on the dot distribution image B, a scanning window at this particular location sees a portion of a 2×2 matrix of four adjacent dots defined by B(i-1,j-1), B(i,j-1), B(i-1,j) and B(i,j). The first three binary values above are found from storage 80 and then the 2×2 overlapping pattern depends on the choice of the fourth binary code between B(i,j)=0, the printer dot "on" state, and B(i,j)=1, the printer dot "off" state. For each state the 2×2 dot pattern selector 90 finds it matching dot overlap pattern from 16 possibilities $P_O-P_{15}$ and the corresponding overlapping coefficient G' in storage 103.

The two overlapping coefficients denoted by $G'_{on}$ and $G'_{off}$ respectively, are interrogated with reference to the original multi-level image signal D(i,j) by comparing D with a threshold level $T=\frac{1}{2} (G'_{on}+G'_{off})$. T is also given by equation (2) showing explicit dependence of binary signal B(i-1,j-1), B(i,j-1), B(i-1,j), and B(i,j).

The purpose of this comparison is to choose one from two possible overlap patterns in order to have better matching with the original image D(i,j). Since G' is the measured optical characteristic feature of the particular chosen printer and is normalized to the extent of gray-levels of the original image D, a smaller difference between D(i,j) and G' yields a closer physical appearance of the printer output to the original image. If the difference (D(i,j)-T) is positive, $G'_{on}$ is closer to D(i,j) than $G'_{off}$, the choice is B(i,j)=0, i.e., having dot printed at the location (i,j). Otherwise the choice is B(i,j)=0, or no dot printed.

At the next stage of this program flow, a known error-diffusion approach, such as the Floyd-Steinberg approach is applied for error distribution. A respective error is given by either $E=D(i,j)-G'_{on}$ or $E=D(i,j)-G'_{off}$, depending on the choice of B(i,j) previously described. The error E is distributed in a weighted manner among immediate-neighbor positions surrounding the present position (i,j). As indicated, the error distribution fractions are 7E/16, 1E/16, 5E/16, and 3E/16, respectively. Again, a detailed description of this error-diffusion approach may be found in the publication by R. Floyd and L. Steinberg previously referred.

The program is stopped when the previously described procedure has reached the end of the image. To arrive at the program "stop", the program is repeated by integer steps for positions in successive columns along the row direction (i+1→i) and by integer steps (j+1→j) among successive row along the column direction for the entire two-dimensional image. The finished binary image B is sent as the printer input signals to a storage 130, from which printing by printer 100 can be initiated.

From the foregoing description, it will be apparent that an improved halftone correction system has been provided which includes a 2×2 matrix-based printed dot overlap correction of image signals printed by a chosen digital printer, the system requiring a significantly reduced number of independent parameters compared to correction systems of the prior art. Several known halftoning approaches can be used in the dot overlap halftone correction system of he present invention, for example, dithering as well as error-diffusion halftoning approaches presently known can be used, although the invention is not limited to these known halftoning approaches. Some known halftoning methods are described by Robert Ulichney in *Digital Halfoning*, MIT Press (1987). Depending on available system components, it is possible also to combine storage elements 80 and 130 or to have halftone computing and correction functions performed by one logic unit, as essentially conducted in the application to error-diffusion halftoning previously described with FIG. 9. Accordingly, the foregoing description should be taken as illustrative and not in a limiting sense.

I claim:

1. A halftone correction system for obtaining dot overlap corrected halftone prints from a chosen digital printer, comprising:

means for scanning a two-dimensional continuous tone image to produce multi-level digital image signals corresponding to optical characteristic features of each one of a multiplicity of image domains, the domains having an equidistant spacing from one another and being arranged in an orthogonal image coordinate system of rows and columns;

means for storing the multi-level digital image signals;

means for generating two-dimensional binary image signals which control the "on" and "off" states of printed dots and represent a potential printer-generated dot image;

means for storing the overlap-uncorrected binary dot image signals;

means for generating a two-dimensional virtual image screen having orthogonally intersecting screen lines defining a multiplicity of rectangular-shaped openings, the openings having the same equidistant spacing from one another as the printer-generated dot image and being arranged in an orthogonal screen coordinate system of-rows and columns parallel to the image coordinate system and offset therefrom by a distance of one half of the spacing along the rows and along the columns, thereby positioning each intersection of screen lines over the center of each one of printed dots printed by the chosen printer;

means for selecting from the stored binary dot image signals two-dimensionally successive groupings of adjacent dots defined by a two-dot×two-dot pattern;

means for providing a sequence of binary test pattern digital signals corresponding to test patterns to the input of a chosen digital printer so that a printed output of the test patterns is produced on a printer medium as patches of arranged printed dots, the test patterns being sufficient in number to characterize the chosen printer;

means for measuring an average value of an optical characteristic feature of the printed output of each one of the test pattern patches;

means for storing the average values of the optical characteristic features of the test patterns as normalized average value extending over a range of signal levels identical to the range of signal levels provided by the multi-level digital image signals corresponding to the image domains;

means for establishing threshold levels for the multi-level digital image signals, the threshold levels being governed by the partial overlap of adjacent printed test pattern dots;

means for deriving a dot overlap correction of the uncorrected binary dot image signals in response to the selected two-dot×two-dot pattern, the correction including the threshold levels, the partial overlap of the chosen digital printer, and a halftoning computation;

means for storing digital dot printing signals containing the derived corrections of the binary dot image signals; and means for initiating the printing by the chosen digital printer of a dot overlap corrected halftone print with the digital dot printing signals containing the derived corrections of the binary dot image signals on a printer medium substantially equivalent to the test pattern printer medium, whereby a dot overlap corrected halftone print of the two-dimensional continuous tone image is obtained.

2. The halftone correction system of claim 1, wherein the multi-level digital image signals corresponding to the image domains and the test pattern digital signals corresponding to the seven test patterns have a range of signal levels extending from zero to 255, with the zero-level corresponding to minimum reflectance and level 255 corresponding to maximum reflectance of a continuous tone print and of a test pattern printed on a reflective printer medium.

3. The halftone correction system of claim 1, wherein the printer medium for printing the test patterns and the halftone corrected print is a non-reflective transparent printer medium.

4. The halftone correction system of claim 1, wherein each of the rectangular-shaped openings of the image screen has dimensions equal to the equidistant spacings between the printed dot image along the directions of the rows and columns of the image coordinate system.

5. The halftone correction system of claim 1, wherein the selecting means includes means for translating a virtual rectangular-shaped window across the openings along the rows and columns of the two-dimensional image screen from a starting position at the first column of the first row to an ending position at the last column of the last row, the rectangular-shaped window having dimensions equal to the equidistant spacing between the printed dot image along the directions of the rows and columns of the image coordinate system.

6. The halftone correction system of claim 1, wherein the generally shaped printed dots produced by the digital printer on the printer medium for the test patterns and for the halftone corrected print have a shape, which is symmetric about both the row direction and the column direction.

7. The halftone correction system of claim 1, wherein the means for determining an average value of an optical characteristic feature of the printed output of each test pattern patch is a means for measuring average reflectance for a printer output printed on a reflective printer medium, and is a means for measuring average transmittance for a printer output printed on a transmissive printer medium.

8. The halftone correction system of claim 1, wherein the threshold level is established in accordance with the relationship $$T = \frac{1}{2} [G'\{B(i-1,j-1), B(i,j-1), B(i-1,j), 0\} - G'\{B(i-1,j-1), B(i,j-1), B(i-1,j), 1\}], \quad (2)$$

where

T=threshold level

G'=a printer output function, such as an average reflectance;

B(i,j)=binary discrete printer input function which controls the printed dots either on or off (i.e. a dot is present or absent);

i,j=integers with $0 \leq i < M$ and $0 \leq j < N$, which determine the location of a dot in an orthogonal matrix of columns of dots (M) and rows of dots (N).

9. The halftone correction system of claim 1, wherein the means for deriving corrections further includes means for computing a difference between the image signal of each image domain and the threshold level and means for using the difference in a halftoning computation.

10. The halftone correction system of claim 1, wherein the test patterns do not exceed seven in number.

11. A method of halftone correction for obtaining dot overlap corrected halftone prints from a chosen digital printer, comprising the steps of:

scanning a two-dimensional continuous tone image to produce multi-level digital image signals corresponding to optical characteristic features of each one of a multiplicity of image domains, the domains having an equidistant spacing from one another and being arranged in an orthogonal image coordinate system or rows and columns;

storing the multi-level digital image signals;

generating two-dimensional binary images signal which control the "on" and "off" states of printed dots and represent a potential printer-generated dot image;

storing the overlap-uncorrected binary dot image signals;

generating a two-dimensional virtual image screen having orthogonally intersecting screen lines defining a multiplicity of rectangular-shaped openings, the openings having the same equidistant spacing from one another as the printer-generated dot image and being arranged in an orthogonal screen coordinate system of rows and columns parallel to the image coordinate system and offset therefrom by a distance of one half of the spacing along the rows and along the columns, thereby positioning each intersection of screen lines over the center of each one of printed dots printed by the chosen printer;

selecting from the stored binary dot image signals two-dimensionally successive groupings of adjacent dots defined by a two-dot×two-dot pattern;

providing a sequence of binary test pattern digital signals corresponding to test patterns to the input of a chosen digital printer so that a printed output of the test patterns is produced on a printer medium as patches of arranged printed dots, the test patterns being sufficient in number to characterize the chosen printer;

measuring an average value of an optical characteristic feature of the printed output of each one of the test pattern patches;

storing the average values of the optical characteristic features of the test patterns as normalized average value extending over a range of signal levels identical to the range of signal levels provided by the multi-level digital image signals corresponding to the image domains;

establishing threshold levels for the multi-level digital image signals, the threshold levels being governed by the partial overlap of adjacent printed test pattern dots;

deriving a dot overlap correction of the uncorrected binary dot image signals in response to the selected two-dot×two-dot pattern, the correction including the threshold levels; the partial overlap of the chosen digital printer, and a halftoning computation;

storing digital dot printing signals containing the derived corrections of the binary dot image signals; and initiating the printing by the chosen digital printer of a dot overlap corrected halftone print with the digital dot printing containing the derived corrections of the binary dot image signals on a printer medium substantially equivalent to the test pattern printer medium, whereby a dot overlap corrected halftone print of the two-dimensional continuous tone image is obtained.

12. The halftone correction method of claim 11, wherein the test patterns do not exceed seven in number.

13. A system for halftone correction which comprises:

means for digitizing an image to be printed on a printer as a halftone screen of dots and providing simultaneously for digital values corresponding to successive overlapping matrices of four immediately adjacent dot positions of said image;

means for characterizing the dot overlap generated by said printer as a plurality of outputs corresponding to each possible arrangement of the dots of said matrices; means for selecting for each of said matrices the one of said outputs corresponding to the arrangement of dots therein; and means for generating the values of signals representing each of said dots to be printed by said printer in each dot position thereof from the digital value of the dots in said image and the value of the output selected by said selecting means.

14. The system according to claim 13 wherein said generating means includes means for obtaining said outputs for each dot position corresponding to a dot being printed or not being printed in said position, and means for generating the value of said signal representing each dot to be printed is responsive to said pair of outputs.

15. The system according to claim 14 wherein said means for generating the value of said signal representing each dot to be printed is responsive to the average value of said pair of outputs.

* * * * *